Dec. 15, 1931.  A. IPRI  1,837,048
FRUIT PRESS
Filed Nov 25, 1930    2 Sheets-Sheet 1
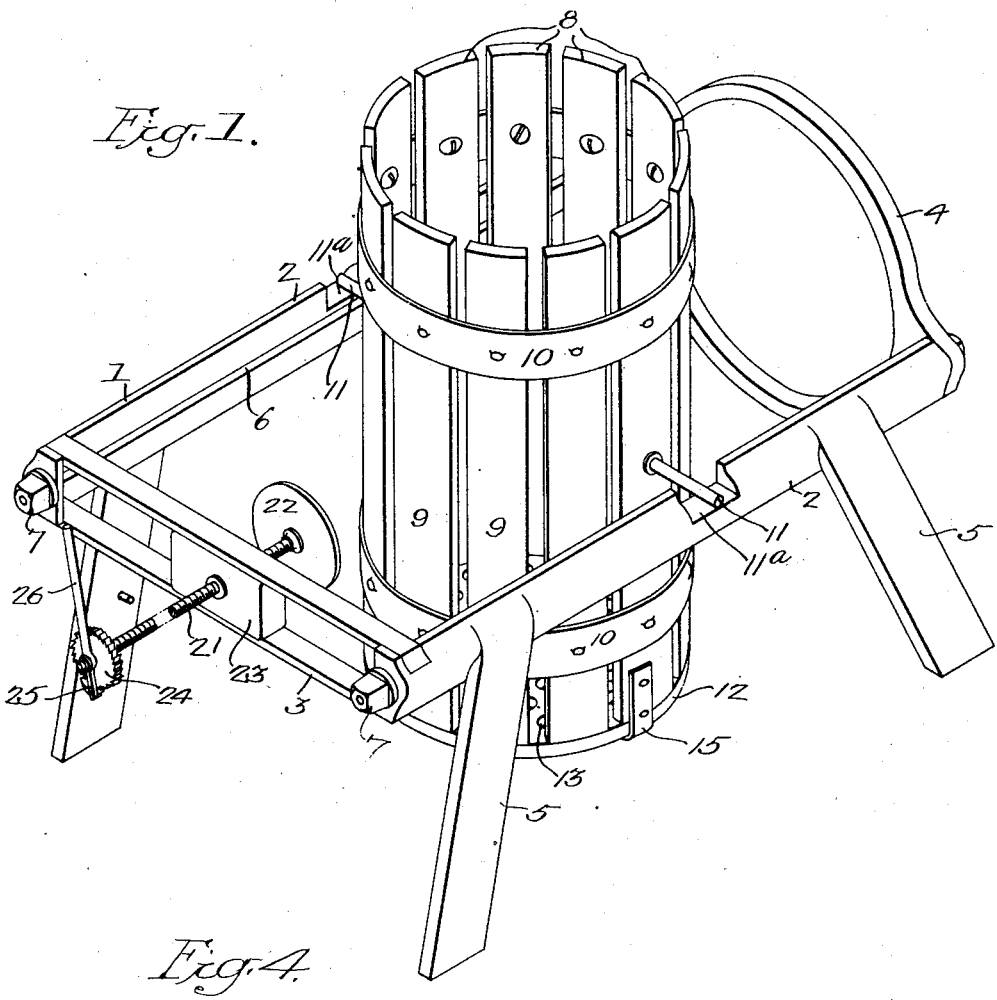

Dec. 15, 1931.  A. IPRI  1,837,048
FRUIT PRESS
Filed Nov 25, 1930  2 Sheets-Sheet 2
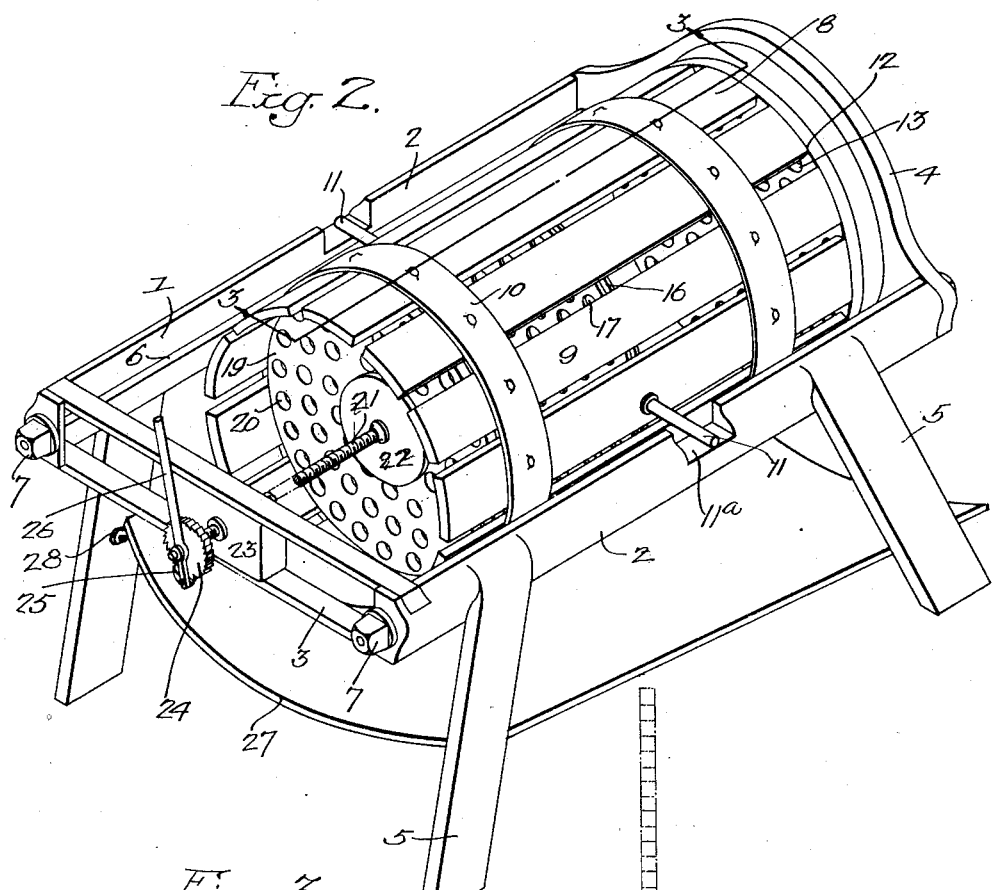
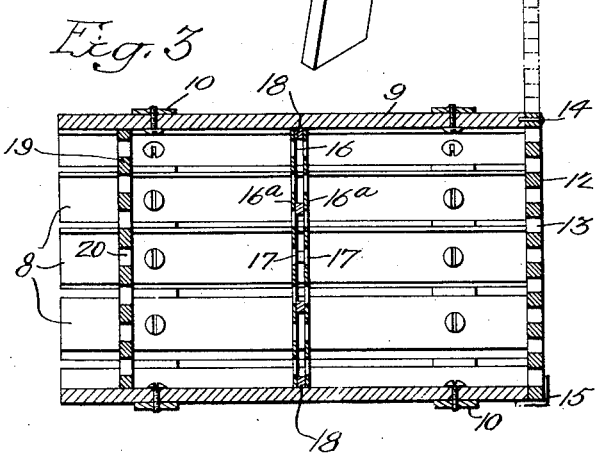

Patented Dec. 15, 1931

1,837,048

UNITED STATES PATENT OFFICE

ALBERT IPRI, OF PHILADELPHIA, PENNSYLVANIA

FRUIT PRESS

Application filed November 25, 1930. Serial No. 498,144.

This invention relates to new and useful improvements in presses and more particularly to presses adapted to be used in the extraction of juices from fruit or the like.

One object of the invention is to provide a press of rugged construction in which the barrel of the press is pivotally mounted on a frame, so that it can be moved to a vertical or horizontal position.

A further object of the invention is to provide means whereby the perforated member at one end of the barrel can be raised or removed to allow the pulp to be discharged from the end of the barrel.

A still further object of the invention is to provide a press that can be readily dismantled, and packed in a comparatively small package for shipment.

A still further object of the invention is to provide an intermediate disk having spaced members which will separate the fruit in the barrel and allow the juice to be more readily extracted.

The invention further resides in certain structural features and details hereinafter described.

In the accompanying drawings:

Figure 1 is a view in perspective, disclosing the press constituting the invention;

Fig. 2 is another view in perspective showing the barrel in position for extracting juice from the fruit in the container;

Fig. 3 is a section view on line 3—3, Fig. 2; and

Fig. 4 shows a modification of the construction of the disk members in the fruit press.

Referring to the drawings, 1 is a frame of wood or other suitable material having longitudinal side members 2 and end members 3 and 4. The end member 4 is in the form of a ring against which a perforated disk bears when pressure is applied to the fruit within the barrel or container. The frame is supported on legs 5 which are preferably detachably secured to the frame. Rods 6 extend the full length of the frame and tie the two end members together so as to resist the compression action of the press. One end of each rod has a head and the other end is threaded to receive a nut 7. These rods are on the inside of the side members. The barrel 8 is composed of longitudinal staves 9 spaced apart to allow the juice extracted from the fruit to readily flow from the barrel and these staves are held by bands or hoops 10 of metal. On the barrel are trunnions 11 adapted to slots 11a on the side members of the frame, these trunnions being adapted to rotate and slide in the slots in the side members of the frame.

The bottom or rear end of the barrel is closed by a cylindrical disk 12, composed of wood or other suitable material. The disk 12 preferably has a plurality of holes 13 therein through which the fruit juice passes from the aforementioned barrel. The said bottom disk 12 is preferably pivoted at 14, thereby permitting the disk 12 to be shifted to a position leaving the bottom of the said container unobstructed and thereby permitting ejection of the pressed pulp. A lug 15 is placed transversely of the pivot 14 and is adapted to support the disk 12 when in the closed position. A second disk 16 is composed of two relatively thin disks 16a—16a of metal or other suitable material, each thin disk 16a having a plurality of holes 17 therein. The disks 16a are placed apart by strips 18 of a material such as wood or other equally suitable material, thus providing a space between the disks 16a—16a, and permitting the flow of juice from the central portion of the mass of fruit, the juice flowing through the holes 17 into the space intermediate the disks 16a and in turn flowing through the spaces between the staves. A pressure disk 19 is provided, said disk adapted to close the top or front of the barrel and is similar to the aforementioned bottom disk 12, said disk 19 being composed of wood or other equally suitable substance and having a plurality of holes 20, therein.

Pressure is applied to the fruit in the container by means of a screw 21 having at its inner end a pressure plate 22. The said plate 22 is adapted to be pivotally and rotatably mounted on the inner end of a screw 21 by any suitable means such as a ball and socket connection. The threads of the screw 21 are adapted to be maintained in the threads of a bearing 23 which is mounted in the end frame member 3. On the screw is a ratchet wheel 24 which is engaged by a pawl 25 on a lever 26 mounted to turn freely on the screw 21, so that the reciprocation of the lever, the screw will be fed forward to compress the fruit in the barrel.

The forward movement of the screw 21 causes the pressure plate 22 to come into contact with the disk 19 which in turn imparts a pressure throughout the entire container and resulting in the extraction of the juices from the fruit contained within the barrel.

In the operation of the press, the barrel is turned to a vertaical position, as shown in Fig. 1, and the bottom disk 12 placed in a position to maintain the fruit within the barrel. The fruit is then placed within the said barrel until the latter is approximately one-half full. The second disk 16 formed by the two separated metallic disks 16a is then preferably placed in position upon the fruit in the barrel and additional fruit placed above said second disk until the barrel is substantially full, then the third or compression disk 19 is placed atop the latter portion of fruit, thereby affording a retaining means for the said fruit within the said barrel. The barrel is then rotated upon the laterally extending trunnions 11 in the slots 11a to a position substantially parallel with the framework. The lever 26 is now operated so that the pawl 25 will ratchet the wheel 24 to move the shaft toward the barrel and on continuing the movement, pressure is imparted to the top disk 19 and subsequently causes the barrel trunnions 11 to slide upon the slots 11a in the side members of the frame 1, the barrel assuming a position such that the bottom disk 12 is moved into firm contact with end frame member 4. The continued forward movement of the screw causes the disks to impart a crushing force to the fruit resulting in the ultimate discharge of the juice therefrom.

I preferably provide an inclined trough 27 which is adapted to hang upon hooks 28, on the frame-supporting legs 5 so that the juice extracted from the fruit pulp will drip into the trough and will flow to any suitable receptacle at the end of the trough.

Fig. 4 shows a modification of the type of disks, wherein the said disks are formed by a circular rim 29 and laterally and vertically transverse strips 30 attached thereto and forming small square apertures 31 to permit egress of the fruit juice from the aforementioned container.

While I have disclosed the embodiment of my invention for the purpose of description, it will be apparent that certain modifications and changes thereto will not depart from the spirit of the invention.

I claim:

A fruit press comprising a frame, supports for the frame an annular ring vertically disposed at one end of said frame, a barrel pivotally and slidably mounted on the frame, and adapted to be filled with fruit and arranged to abut said annular ring when in a horizontal position, the said barrel being composed of longitudinal staves spaced apart to allow the juice of the fruit to flow from the barrel, end disks in conjunction with the barrel adapted to maintain the fruit entirely within the barrel, and pressure means cooperating with the annular ring for extracting the juice from the fruit.

ALBERT IPRI.